United States Patent
Cupferman et al.

(10) Patent No.: US 12,256,733 B2
(45) Date of Patent: Mar. 25, 2025

(54) ANTIMICROBIAL MIXTURE CONTAINING 4-(3-ETHOXY-4-HYDROXYPHENYL)BUTAN-2-ONE AND AN ACID OR SILVER-BASED COMPOUND, AND COSMETIC COMPOSITION CONTAINING SAME

(71) Applicant: L'OREAL, Paris (FR)

(72) Inventors: Sylvie Cupferman, Chevilly Larue (FR); Florence Menard-Szczebara, Chevilly Larue (FR); Julien Galvan, Chevilly Larue (FR)

(73) Assignee: L'OREAL, Paris (FR)

( * ) Notice: Subject to any disclaimer, the term of this patent is extended or adjusted under 35 U.S.C. 154(b) by 532 days.

(21) Appl. No.: 17/286,872

(22) PCT Filed: Dec. 6, 2019

(86) PCT No.: PCT/EP2019/084046
§ 371 (c)(1),
(2) Date: Apr. 20, 2021

(87) PCT Pub. No.: WO2020/126562
PCT Pub. Date: Jun. 25, 2020

(65) Prior Publication Data
US 2023/0065230 A1    Mar. 2, 2023

(30) Foreign Application Priority Data
Dec. 21, 2018 (FR) ...................................... 1873727

(51) Int. Cl.
*A01N 35/02* (2006.01)
*A01N 37/44* (2006.01)
*A01N 59/16* (2006.01)
*A01P 1/00* (2006.01)

(52) U.S. Cl.
CPC ............. *A01N 35/02* (2013.01); *A01N 37/44* (2013.01); *A01N 59/16* (2013.01); *A01P 1/00* (2021.08)

(58) Field of Classification Search
CPC .................................. A01N 37/44; A01P 1/00
See application file for complete search history.

(56) References Cited

U.S. PATENT DOCUMENTS

2002/0031537 A1* 3/2002 Bachmann ............... A61Q 5/02
                                                                514/561

FOREIGN PATENT DOCUMENTS

WO     WO-2012130953 A1 * 10/2012 ............... A61K 8/34
WO     WO 2018/115058 A1    6/2018

OTHER PUBLICATIONS

Food Microbiology 99 (2021)103797) (Year: 2021).*

* cited by examiner

*Primary Examiner* — Snigdha Maewall
(74) *Attorney, Agent, or Firm* — POLSINELLI PC

(57) ABSTRACT

The invention relates to an antimicrobial mixture containing 4-(3-ethoxy-4-hydroxyphenyl)butan-2-one and an acid and/or silver-based compound, and also to a cosmetic, pharmaceutical or nutritional composition containing such a mixture.
Application to caring for, making up and cleansing keratin materials; to preserving foods and to water treatment.

20 Claims, No Drawings

ANTIMICROBIAL MIXTURE CONTAINING 4-(3-ETHOXY-4-HYDROXYPHENYL)BUTAN-2-ONE AND AN ACID OR SILVER-BASED COMPOUND, AND COSMETIC COMPOSITION CONTAINING SAME

CROSS REFERENCE TO RELATED APPLICATIONS

This application is a National Phase filing under 35 U.S.C. § 371 of PCT/EP2019/084046 filed on 6 Dec. 2019; which application in turn claims priority to Application No. 1873727 filed in France on 21 Dec. 2018. The entire contents of each application are hereby incorporated by reference.

The present invention relates to an antimicrobial mixture containing 4-(3-ethoxy-4-hydroxyphenyl)butan-2-one and an alcohol compound, and also to a cosmetic composition containing such a mixture.

TECHNICAL FIELD 4-(3-Ethoxy-4-hydroxyphenyl)butan-2-one (ketone compound) is a beneficial substance as a preserving agent for compositions, in particular cosmetic, pharmaceutical or nutritional compositions, for protecting the compositions against microbial contamination, as described in patent application WO 2011/039445.

However, it is desirable to be able to incorporate said ketone compound in reduced concentration in compositions, notably cosmetic or dermatological compositions, while at the same time maintaining good antimicrobial preservation performance. Combinations of the ketone compound with other compounds that have good antimicrobial efficacy are thus sought for this purpose.

The invention may be better understood on reading the following description accompanied with nonlimiting implementation examples thereof with reference to the appended drawings, in which:

The inventors have discovered, unexpectedly, that the combination of 4-(3-ethoxy-4-hydroxyphenyl)butan-2-one and salts thereof with an organic or inorganic acid or base, and solvates thereof such as the hydrates; with an acid compound chosen from the trisodium salt of ethylenediaminedisuccinic acid, the salt of 3-hydroxy-2-pentylcyclopentaneacetic acid especially sodium salt of 3-hydroxy-2-pentylcyclopentaneacetic acid, salt of hydroxymethylglycinate especially salt of sodium hydroxymethylglycinate or citrate salts especially silver citrate makes it possible to obtain an antimicrobial mixture which has synergistic antimicrobial activity.

The results of the examples described below show the synergistic antimicrobial activity obtained with the minimum inhibitory concentration (MIC) measurements taken with several mixtures. The antimicrobial activity is considered as being synergistic when the antimicrobial mixture makes it possible to obtain a percentage of strain growth of less than or equal to 25%, or even less than or equal to 20%.

The combination of 4-(3-ethoxy-4-hydroxyphenyl)butan-2-one with the salt, notably the trisodium salt, of ethylenediaminedisuccinic acid makes it possible to obtain an antimicrobial mixture with synergistic antimicrobial activity, in particular on the Gram-positive bacterium *Staphylococcus aureus*.

The combination of 4-(3-ethoxy-4-hydroxyphenyl)butan-2-one with the salt, notably the sodium salt, of 3-hydroxy-2-pentylcyclopentaneacetic acid makes it possible to obtain an antimicrobial mixture which has synergistic antimicrobial activity, in particular on yeasts, in particular on *Candida albicans*.

The combination of 4-(3-ethoxy-4-hydroxyphenyl)butan-2-one with the hydroxymethylglycinate salt, notably the sodium hydroxymethylglycinate salt, makes it possible to obtain an antimicrobial mixture which has synergistic antimicrobial activity, in particular on the Gram-positive bacterium *Enterococcus faecalis*.

The combination of 4-(3-ethoxy-4-hydroxyphenyl)butan-2-one with a silver-based compound, notably silver citrate, makes it possible to obtain an antimicrobial mixture with synergistic antimicrobial activity, in particular on molds, notably on *Aspergillus niger*.

More precisely, a subject of the invention is an antimicrobial mixture comprising, or constituted of (or consisting of), 4-(3-ethoxy-4-hydroxyphenyl)butan-2-one and at least one acid compound chosen from: i) ethylenediaminedisuccinic acid or salts thereof; ii) the jasmonate compounds (I) described below; iii) the glycinate compounds (II) described below or at least one silver-based compound described below.

For the purposes of the present invention, and unless otherwise indicated:

an "anionic counterion" is an anion or an anionic group derived from an organic or mineral acid salt which counterbalances the cationic charge of the ammonium salt; more particularly, the anionic counterion is chosen from: i) halides such as chloride or bromide; ii) nitrates; iii) sulfonates, including $C_1$-$C_6$ alkylsulfonates: Alk-S(O)$_2$O$^-$ such as methanesulfonate or mesylate and ethanesulfonate; iv) arylsulfonates: Ar—S(O)$_2$O$^-$ such as benzenesulfonate and toluenesulfonate or tosylate; v) citrate; vi) succinate; vii) tartrate; viii) lactate; ix) alkyl sulfates: Alk-O—S(O)O$^-$ such as methyl sulfate and ethyl sulfate; x) aryl sulfates: Ar—O—S(O)O$^-$ such as benzene sulfate and toluene sulfate; xi) alkoxy sulfates: Alk-O—S(O)$_2$O$^-$ such as methoxy sulfate and ethoxy sulfate; xii) aryloxy sulfates: Ar—O—S(O)$_2$O$^-$, xiii) phosphates O=P(OH)$_2$—O$^-$, O=P(O$^-$)$_2$—OH O=P(O$^-$)$_3$, HO—[P(O)(O$^-$)]$_w$—P(O)(O$^-$)$_2$ with w being an integer; xiv) acetate; xv) triflate; and xvi) borates such as tetrafluoroborate, xvii) disulfate (O=)$_2$S(O$^-$)$_2$ or SO$_4^{2-}$ and monosulfate HSO$_4^-$, preferably anionic counterion is an halide such as Cl$^-$ or Br$^-$, an "organic or inorganic acid salt" is more particularly chosen from salts chosen from a salt derived from i) hydrochloric acid HCl, ii) hydrobromic acid HBr, iii) sulfuric acid H$_2$SO$_4$, iv) alkylsulfonic acids: Alk-S(O)$_2$OH such as methanesulfonic acid and ethanesulfonic acid; v) arylsulfonic acids: Ar—S(O)$_2$OH such as benzenesulfonic acid and toluenesulfonic acid; vi) citric acid; vii) succinic acid; viii) tartaric acid; ix) lactic acid; x) alkoxysulfinic acids: Alk-O—S(O)OH such as methoxysulfinic acid and ethoxysulfinic acid; xi) aryloxysulfinic acids such as tolueneoxysulfinic acid and phenoxysulfinic acid; xii) phosphoric acid H$_3$PO$_4$, xiii) acetic acid CH$_3$C(O)OH, xiv) triflic acid CF$_3$SO$_3$H, and xv) tetrafluoroboric acid HBF$_4$;

an "organic or inorganic base salts" means salts of bases or alkaline agents as defined below, such as alkali metal hydroxides, such as sodium hydroxide, potassium hydroxide, or alkaline earth metal calcium hydroxide, ammonia, amines or alkanolamines.

an "alkyl radical" is a linear or branched hydrocarbonyl chain saturated; moreover, the addition salts that may be used in the context of the invention with 4-(3-ethoxy-4-hydroxyphenyl)butan-2-one are especially chosen from addition salts with a cosmetically acceptable base such as basifying agents as defined below, for instance alkali metal hydroxides such as sodium hydroxide, potassium hydroxide, aqueous ammonia, amines or alkanolamines; preferably 4-(3-ethoxy-4-hydroxyphenyl)butan-2-one can be in a salt form such as formula (I'):

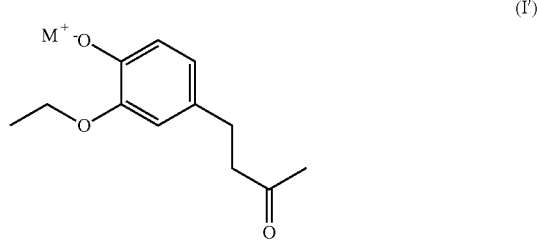

(I')

Formula (I') in which M$^+$ represents a cationic counter ion especially an alkali metal such as sodium or potassium, or alkaline earth metal such as calcium or ammonium.

A subject of the invention is also a composition comprising said antimicrobial mixture.

The composition may comprise a physiologically acceptable medium. The composition is notably a cosmetic or pharmaceutical or dermatological composition.

The composition may optionally be a nutritional composition (food).

A subject of the invention is also a composition, notably a cosmetic or dermatological composition, comprising, in a physiologically acceptable medium, said mixture described previously.

A subject of the invention is also a process for the nontherapeutic cosmetic treatment of keratin materials, comprising the application to the keratin materials of a composition, notably a cosmetic composition, as described previously. The process may be a cosmetic process for caring for or making up or cleansing keratin materials.

A subject of the invention is also a process for preserving a composition, notably comprising a physiologically acceptable medium, in particular a cosmetic or pharmaceutical composition, or a nutritional composition, characterized in that it consists in incorporating into said composition an antimicrobial mixture as described previously.

4-(3-Ethoxy-4-hydroxyphenyl)butan-2-one is a compound of formula:

[Chem. 1]

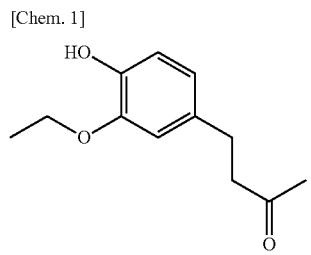

and salts thereof with an organic or inorganic acid or base, and solvates thereof such as the hydrates.

According to a first embodiment, a subject of the invention is an antimicrobial mixture comprising, or constituted of (or consisting of), 4-(3-ethoxy-4-hydroxyphenyl)butan-2-one and ethylenediaminedisuccinic acid or salts thereof.

The salts may be chosen from the ammonium salts, the salts of alkali metals or alkaline-earth metals such as calcium, potassium, aluminum or zinc, salts of $(C_1-C_4)$alkanolammonium such as monoethanolamine or triethanolamine, ammonium salts, and preferably the salts of alkaline-earth metals such as calcium (such as the product sold under the name.

Advantageously, 4-(3-ethoxy-4-hydroxyphenyl)butan-2-one and ethylenediaminedisuccinic acid or salts thereof are present in said mixture in a content such that the 4-(3-ethoxy-4-hydroxyphenyl)butan-2-one/ethylenediaminedisuccinic acid or salts thereof weight ratio ranges from 1.5 to 15, preferably ranges from 2.5 to 15, preferentially ranges from 5 to 15 and more preferentially ranges from 10 to 15. Such a mixture has good antimicrobial activity on the Gram-positive bacterium *Staphylococcus aureus*.

Preferably, the composition comprising the antimicrobial mixture may comprise 4-(3-ethoxy-4-hydroxyphenyl)butan-2-one in a content ranging from 0.35% to 0.8% by weight, relative to the total weight of the composition, preferentially ranging from 0.4% to 0.6% by weight.

According to a second embodiment, a subject of the invention is an antimicrobial mixture comprising, or constituted of (or consisting of), 4-(3-ethoxy-4-hydroxyphenyl)butan-2-one and a jasmonate compound (I).

The jasmonate compound has the formula (I) below:

[Chem. 2]

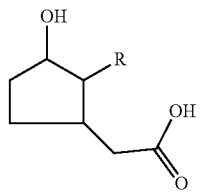

(I)

and salts, and solvates thereof such as the hydrates;
in which R denotes a saturated or unsaturated linear hydrocarbon-based radical containing from 2 to 7 carbon atoms. In particular, R may be a pentyl, pentenyl, hexyl or heptyl radical, preferably a pentyl radical.
The salts of compound (I) may be chosen from the salts of alkali metals or alkaline-earth metals such as sodium or potassium and also the magnesium, strontium, copper, manganese or zinc salts. Preferentially, the salts of alkali metals such as sodium salt are used.

Advantageously, the compound of formula (I) is chosen from 3-hydroxy-2-[(2Z)-2-pentenyl]cyclopentaneacetic acid or 3-hydroxy-2-pentylcyclopentaneacetic acid and/or salts thereof. Preferably, compound (I) is 3-hydroxy-2-pentylcyclopentaneacetic acid and/or salts thereof, notably a sodium salt. Preferentially, compound (I) is the sodium salt of 3-hydroxy-2-pentylcyclopentaneacetic acid.

The antimicrobial mixture may have a 4-(3-ethoxy-4-hydroxyphenyl)butan-2-one/jasmonate compound (I) weight ratio ranging from 0.3 to 1.20, preferably ranging from 0.45 to 1.20, preferentially ranging from 0.6 to 1.

Such a mixture has good antimicrobial activity on yeasts, in particular on *Candida albicans*.

Preferably, the composition comprising the antimicrobial mixture may comprise 4-(3-ethoxy-4-hydroxyphenyl)butan-2-one in a content ranging from 0.08% to 0.4% by weight, relative to the total weight of the composition, preferably ranging from 0.09% to 0.35% by weight, preferably ranging from 0.1% to 0.3% by weight.

According to a third embodiment, a subject of the invention is an antimicrobial mixture comprising, or constituted of (or consisting of), 4-(3-ethoxy-4-hydroxyphenyl)butan-2-one and a glycinate compound of formula II.

The glycinate compound has the formula (II) below:

[Chem. 3]

$$R_1R_2NCH_2COO^-X^+ \quad (II)$$

in which formula (II):
$R_1$ and $R_2$ denote a hydrogen atom or a hydroxy($C_1$-$C_4$) alkyl group such as HOCH$_2$— or HOCH$_2$CH$_2$—; preferably, $R_1$ represents a hydrogen atom and $R_2$ represents a HOCH$_2$— group;
$X^+$ denotes a cationic counterion preferably chosen from alkali metals and alkaline-earth metals such as sodium, calcium and aluminum, and preferably an alkali metal such as sodium.

Advantageously, the glycinate compound (II) may be chosen from hydroxymethylglycinate salts, notably sodium hydroxymethylglycinate, dihydroxyethylglycinate salts, notably sodium dihydroxyethylglycinate, glycinate salts, notably sodium glycinate, calcium glycinate or aluminum glycinate, and preferably sodium hydroxymethylglycinate, such as the product sold under the name Suttocide A (50% solution) by the company ISP.

The antimicrobial mixture may have a 4-(3-ethoxy-4-hydroxyphenyl)butan-2-one/glycinate compound II weight ratio ranging from 10 to 80, preferably from 10 to 60, preferably ranging from 20 to 60, and more preferentially ranging from 40 to 60. Such a mixture has good antimicrobial activity on the Gram-positive bacterium *Enterococcus faecalis*.

Preferably, the composition comprising the antimicrobial mixture may comprise 4-(3-ethoxy-4-hydroxyphenyl)butan-2-one in a content ranging from 0.05% to 0.45% by weight relative to the total weight of the composition, preferably ranging from 0.08% to 0.45% by weight, preferably ranging from 0.15% to 0.45% by weight, preferably ranging from 0.18% to 0.4% by weight.

According to a fourth embodiment, a subject of the invention is an antimicrobial mixture comprising, or constituted of (or consisting of) 4-(3-ethoxy-4-hydroxyphenyl) butan-2-one and a silver-based (Ag) compound chosen from: i) silver I and II oxides such as Ag$_2$O and AgO, ii) silver particles such as Ag/TiO$_2$ and Ag/SiO$_2$; iii) Ag I or Ag II salts chosen from the following formulae: a) AgHal with Hal representing a halogen atom, preferably Cl such as silver chloride AgCl, b) AgHal$_2$, with Hal being identical or different, preferably identical, and Hal as defined previously; and c) Ag$_x$R$^3_z$ and also solvates thereof such as the hydrates, with
$R^3$, which may be identical or different, representing a group chosen from:
sulfate such as Ag$_2$SO$_4$;
nitrate such as AgNO$_3$;
hydroxy such as AgOH,
($C_1$-$C_6$)alkylcarboxylate in which the ($C_1$-$C_6$)alkyl group is linear or branched and may optionally be substituted with one or more hydroxyl, carboxyl or carboxylate groups, such as Ag acetate, Ag propionate, Ag lactate and Ag citrate; and an aryl group substituted with at least one carboxylate group and optionally substituted with one or more hydroxyl groups such as silver benzoate or silver salicylate; and
1≤z≤6, 1≤x≤4.

Preferentially, the silver-based compounds of the invention are chosen from silver ($C_1$-$C_6$)alkylcarboxylates such as Ag lactate and Ag citrate and silver arylcarboxylates, such as silver benzoate and silver salicylate and more preferentially silver citrate.

Use is notably made of the silver citrate hydrate which has the CAS No. 95508-00-2.

Advantageously, 4-(3-ethoxy-4-hydroxyphenyl)butan-2-one and the silver-based compound are present in said mixture in a content such that the 4-(3-ethoxy-4-hydroxyphenyl)butan-2-one/silver-based compound weight ratio ranges from 0.4 to 4, preferably from 0.4 to 3.6, preferably from 0.7 to 3.6, preferably from 1.5 to 3.6. Such a mixture has good antimicrobial activity on molds, notably on *Aspergillus niger*.

Preferably, the composition comprising the antimicrobial mixture may comprise 4-(3-ethoxy-4-hydroxyphenyl)butan-2-one in a content ranging from 0.015% to 0.09% by weight relative to the total weight of the composition, preferably ranging from 0.015% to 0.08% by weight, preferably ranging from 0.02% to 0.07% by weight, preferably ranging from 0.02% to 0.06% by weight.

Another object of the invention is a composition, preferably a cosmetic, pharmaceutical or nutritional composition comprising
at least one 4-(3-ethoxy-4-hydroxyphenyl)butan-2-one and salts thereof with an organic or mineral acid, and solvates thereof such as the hydrates and at least one acid compound chosen from:
i) ethylenediaminedisuccinic acid and salts thereof;
ii) the jasmonate compounds (I) and salts thereof;

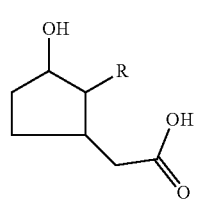

(I)

in which formula (I) R denotes a saturated or unsaturated linear hydrocarbon-based radical containing from 2 to 7 carbon atoms, in particular, R may be a pentyl, pentenyl, hexyl or heptyl radical, preferably a pentyl radical;
iii) the glycinate compounds of formula (II) and the salts thereof:

$$R_2NCH_2COO^-X^+ \quad (II)$$

$R_1$ and $R_2$ denoting a hydrogen atom or a hydroxy ($C_1$-$C_4$)alkyl group such as HOCH$_2$— or HOCH$_2$CH$_2$—; preferably, $R_1$ represents a hydrogen atom and $R_2$ represents a HOCH$_2$— group;
$X^+$ denoting a cationic counterion preferably chosen from alkali metals and alkaline-earth metals such as sodium, calcium and aluminum, and preferably an alkali metal such as sodium;

or at least one silver-based compound chosen from:
i) silver I and II oxides such as $Ag_2O$ and AgO,
ii) silver particles such as $Ag/TiO_2$ and $Ag/SiO_2$,
iii) Ag I or Ag II salts chosen from the following formulae:
a) AgHal with Hal representing a halogen atom, preferably Cl such as silver chloride AgCl,
b) $AgHal_2$, with Hal being identical or different, preferably identical, and Hal as defined previously; and
c) $Ag_xR^3_z$ and also solvates thereof such as the hydrates, with
$R^3$, which may be identical or different, representing a group chosen from:
sulfate such as $Ag_2SO_4$;
nitrate such as $AgNO_3$;
hydroxy such as AgOH,
$(C_1-C_6)$alkylcarboxylate in which the $(C_1-C_6)$alkyl group is linear or branched and is optionally substituted with one or more hydroxyl, carboxyl or carboxylate groups, such as Ag acetate, Ag propionate, Ag lactate and Ag citrate;
an aryl group substituted with at least one carboxylate group and optionally substituted with one or more hydroxyl groups such as silver benzoate or silver salicylate; and
x and z are integers such that $1 \leq z \leq 6$, $1 \leq x \leq 4$.

A subject of the invention is also a composition comprising, in a physiologically acceptable medium, the antimicrobial mixture described previously.

The term "physiologically acceptable medium" means a medium that is compatible with human keratin materials such as the skin, the scalp, the hair and the nails. Said medium may comprise one or more additional ingredients other than the ketone compound and the acid compound or the silver compound.

The compound 4-(3-ethoxy-4-hydroxyphenyl)butan-2-one may be present in the composition according to the invention in a content ranging from 0.01% to 5% by weight, relative to the total weight of the composition, preferably ranging from 0.01% to 3% by weight, preferentially ranging from 0.01% to 2.5% by weight, more preferentially ranging from 0.01% to 2% by weight and better still ranging from 0.015% to 0.8% by weight, or else in the contents described previously.

The composition may comprise at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

The composition according to the invention may comprise an aqueous phase.

The composition may also comprise a polyol that is water-miscible at room temperature (25° C.), notably chosen from polyols notably containing from 2 to 10 carbon atoms, preferably containing from 2 to 6 carbon atoms, such as glycerol, propylene glycol, 1,3-propanediol, butylene glycol, pentylene glycol, hexylene glycol, dipropylene glycol, diethylene glycol or diglycerol. Advantageously, the composition according to the invention comprises 1,3-propanediol, notably in a content ranging from 0.1% to 20% by weight, preferably ranging from 0.1% to 10% by weight and preferentially ranging from 0.5% to 5% by weight, relative to the total weight of the composition.

The compositions according to the invention may be in the form of oil-in-water (O/W) emulsions, water-in-oil (W/O) emulsions or multiple emulsions (triple: W/O/W or O/W/O), oily solutions, oily gels, aqueous solutions, aqueous gels, or solid compositions. These compositions are prepared according to the usual methods.

The compositions according to the invention may be more or less fluid and may have the appearance of a white or colored cream, an ointment, a milk, a lotion, a serum, a paste or a foam. They may be optionally applied to the skin in aerosol form. They may also be in solid form, for example in the form of a stick or a compact powder.

The composition according to the invention may notably be in the form of:
a makeup product, notably for making up the skin of the face, the body, or the lips or the eyelashes;
an aftershave gel or lotion; a shaving product;
a deodorant (stick, roll-on or aerosol);
a hair-removing cream;
a body hygiene composition such as a shower gel or a shampoo;
a pharmaceutical composition;
a solid composition such as a soap or a cleansing bar;
an aerosol composition also comprising a pressurized propellant;
a hair-setting lotion, a hair-styling cream or gel, a dyeing composition, a permanent-waving composition, a lotion or a gel for combating hair loss, or a hair conditioner;
a composition for caring for or cleansing the skin.

A subject of the invention is also a process for preparing a composition, notably pharmaceutical or nutritional composition, comprising a step of mixing 4-(3-ethoxy-4-hydroxyphenyl)butan-2-one, the acid compound or the silver compound and one or more additional ingredients, notably cosmetic or pharmaceutical or nutritional ingredients, such as those described previously.

The antimicrobial mixtures of the first, second and fourth embodiments described previously may be used for preserving foodstuffs (food).

A subject of the invention is also a nutritional composition comprising an antimicrobial mixture chosen from those of the fourth, fifth and sixth embodiments described previously.

The nutritional composition (food) may comprise at least one foodstuff chosen from meats, fish, crustaceans, vegetables, fruit, cereals, eggs, butter, milk, vinegar, water, vegetable oils, sugars, salt, spices, emulsifiers, alcohols, thickeners and honey.

Preferably the 4-(3-ethoxy-4-hydroxyphenyl)butan-2-one is predissolved in a food-grade solvent before being added to the food. Solvents that may be used include ethanol, propylene glycol, isopropyl alcohol and mixtures thereof, optionally combined with water.

The food according to the invention may be, for example, in the form of bread, cake, sauce, candy, a cooked dish, confectionery, jelly, dessert, nougat, drinks, juice, syrup, wine, beer, ravioli, mousse, compote, mayonnaise, mustard, vinaigrette, crisps, sausage, gnocchi, polenta, pancakes, pates, cheeses, flour, delicatessen meats or soup.

The 4-(3-ethoxy-4-hydroxyphenyl)butan-2-one may be present in the food composition in the concentrations described previously.

The synergistic activity of the antimicrobial mixture according to the invention on Gram-negative bacteria, in particular on bacteria of the species *Pseudomonas aeruginosa* is also of interest in water treatment. This species is notably among the microorganisms commonly sought when a microbiological analysis of a water sample is performed.

The synergistic activity of the antimicrobial mixture according to the invention on fungi, in particular on the species *Candida albicans*, is also of interest in water treatment. Specifically, fungi represent one of the sources of contamination of water as mentioned in the article "*Fungal Contaminants in drinking water regulation? A tale of ecology, exposure, purification and clinical relevance*" Int. J. Environ. Res. Public Health 2017, 14, 636.

The synergistic activity of the antimicrobial mixture according to the invention on Gram-positive bacteria, in particular on bacteria of the species *Enterococcus faecalis* is also of interest in water treatment. Specifically, bacteria of the genus *Enterococcus* represent one of the sources of contamination of water as mentioned in the article "*Enterococci, from commensals to leading causes of drug resistant infection*" Michael S. Gilmore et al., 2014, Massachusetts Eye and Ear Infirmary, Boston.

The antimicrobial mixtures of the second, third and fourth embodiments described previously may be used for water treatment.

The present invention also relates to the use of the antimicrobial mixture chosen from those of the third, fourth, fifth and sixth embodiments described previously in water treatment, in which said water is chosen from domestic or industrial waters, waters from aquatic media, swimming pool/spa waters, and waters from air-conditioning systems.

The term "water treatment" refers to a continuous or discontinuous (batch-type) treatment which consists in adding a substance to a water sample to be treated or to a water stream to be treated for the purpose either of preventing the contamination of the water with a contaminant or of partially or totally decontaminating of said contaminant said water to be treated Preferably, the water treatment performed in the context of the present invention consists in continuously or discontinuously adding a substance to a sample of water to be treated or to a water stream to be treated in order to partially or totally decontaminate of a contaminant said water to be treated.

The contaminant may be a microorganism, in particular a bacterium and/or a fungus.

Even more preferentially, said water treatment is a treatment of water contaminated with one or more microorganisms, preferably with Gram-positive or Gram-negative bacteria or fungi of the species *Enterococcus faecalis, Candida albicans* or *Pseudomonas aeruginosa*.

The term "waters of aquatic media" means the waters of lakes, tributary rivers, pools, mainstem rivers, sea or ocean bathing areas, underground waters such as well waters and groundwaters, and aquarium waters.

For the purposes of the present invention, the "domestic or industrial waters" comprise spent waters before they have been treated in a purification plant, waters undergoing treatment in a purification plant, waters before they have been treated in a drinking water plant, waters undergoing treatment in a drinking water plant, and also waters circulating in potable or non-potable urban networks, for instance waters circulating in pipeworks.

The present invention also relates to a continuous or discontinuous water treatment process comprising at least one step of placing a water sample to be treated or a water stream to be treated, said water to be treated being chosen from domestic or industrial waters, waters from aquatic media, swimming pool/spa waters, and waters from air-conditioning systems, in contact with the antimicrobial mixture according to the invention.

Preferably, said step of placing the water to be treated in contact with the antimicrobial mixture according to the invention may notably be performed by injection in liquid form of said compound, by passage through a filter or a filtering cartridge comprising said compound, or by administration in solid form of said compound notably in the form of granules, lozenges or pellets.

The 4-(3-ethoxy-4-hydroxyphenyl)butan-2-one may be used in a proportion of at least 0.06% by weight, preferably at least 0.1% by weight and better still at least 0.5% by weight relative to the total weight of water to be treated. In a preferred embodiment, the compounds of formula (I), alone or as a mixture, may be used in a proportion of at least 1% by weight relative to the total weight of water to be treated.

The 4-(3-ethoxy-4-hydroxyphenyl)butan-2-one may be used in a concentration ranging from 0.06% to 10% by weight, preferably from 0.06% to 10% by weight and better still from 0.06% to 5% by weight relative to the total weight of water to be treated. In a preferred embodiment, the 4-(3-ethoxy-4-hydroxyphenyl)butan-2-one may be used in a concentration ranging from 0.1% to 1% by weight relative to the total weight of water to be treated.

In a preferred embodiment, the 4-(3-ethoxy-4-hydroxyphenyl)butan-2-one is used in combination with an effective amount of at least one organic solvent which may be chosen from ethanol, 1,2-propylene glycol, 1,3-propanediol, PEG-8 (polyethylene glycol containing 8 ethylene glycol units), propylene carbonate, dipropylene glycol, 1,2-hexylene glycol, PEG-4.

Preferably, the organic solvent is chosen from ethanol, 1,2-propylene glycol, 1,3-propanediol, PEG-8 and propylene carbonate.

The solvent may be used in a content ranging from 0.05% to 10% by weight relative to the total weight of the water to be treated, preferably ranging from 0.1% to 5% by weight and preferentially ranging from 0.1% to 2.5% by weight relative to the total weight of the water to be treated.

The invention is illustrated in greater detail in the example that follows. The amounts of the ingredients are expressed as weight percentages.

EXAMPLES

Example 1: Determination of the Synergistic Antimicrobial Activity as MIC

The demonstration of a synergistic antimicrobial activity effect with a mixture of 4-(3-ethoxy-4-hydroxyphenyl)butan-2-one (referred to as substance A) and of an acid compound (referred to as substance B) was performed by calculating the synergy index (or FIC index) according to the following formula:

$$\text{FIC Index} = (\text{MIC of } A \text{ with } B/\text{MIC of } A) + (\text{MIC } B \text{ with } A/\text{MIC of } B) \quad \text{[Math. 1]}$$

with:
- MIC of A with B: minimum concentration of product A in the combination A+B which makes it possible to obtain an inhibitory effect;
- MIC of B with A: minimum concentration of product B in the combination A+B which makes it possible to obtain an inhibitory effect;
- MIC of A: minimum inhibitory concentration of product A alone;
- MIC of B: minimum inhibitory concentration of product B alone.

This formula was described for the first time in the article by F. C. Kull, P. C. Eisman, H. D. Sylwestrowka, and R. L. Mayer, Applied Microbiology 9:538-541, 1961.

For each compound tested alone, the MIC is considered as the first concentration which makes it possible to obtain a microbial growth percentage of less than or equal to 25%.

As regards the combinations tested, MIC of A with B and MIC of B with A are the respective concentrations of A and of B in the combinations which make it possible to obtain a microbial growth percentage of less than or equal to 25%.

Interpretation of the FIC Index:

When the FIC index value is less than or equal to 1, it is considered that the combination of test compounds has a synergistic effect.

The summary of the results obtained is presented in the following tables.

The combination of compounds A and B was tested on the following strains or a part thereof: *Aspergillus niger, Staphylococcus aureus, Pseudomonas aeruginosa, Enterococcus faecalis, Candida albicans*.

The microbial strain *Aspergillus niger* ATCC 6275, and a double-concentration Sabouraud broth liquid culture medium supplemented with polyoxyethylenated (20 OE) sorbitan monopalmitate (Tween 40 from Croda) and Phytagel© BioReagent were used (i.e. a mixture of 5 g of Phytagel+0.6 g of Tween 40+60 g of Sabouraud broth).

The microbial strain *Staphylococcus aureus* ATCC 6538 and a double-concentration nutrient broth liquid culture medium were used.

The microbial strain *Pseudomonas aeruginosa* ATCC 9027 and a double-concentration nutrient broth liquid culture medium were used.

The microbial strain *Enterococcus faecalis* ATCC 33186 and a double-concentration BHI (Brain Heart Infusion) broth liquid culture medium were used.

The microbial strain *Candida albicans* ATCC 10231, and a double-concentration Sabouraud broth liquid culture medium were used (i.e. a mixture of 5 g of Phytagel+0.6 g Tween 40+60 g of Sabouraud broth).

A 96-well microplate at an incubation temperature of 32.5° C. is used.

The incubation time of the microplate is:

from 24 to 30 h under aerobic conditions for microbial *Aspergillus niger* ATCC 6275;

from 18 to 24 h under aerobic conditions for *Candida albicans* ATCC 10231, *Pseudomonas aeruginosa* ATCC 9027 and *Staphylococcus aureus* ATCC 6538;

from 24 to 48 h under aerobic conditions for *Enterococcus faecalis* ATCC 33186.

Tests

For each compound:
A=4-(3-ethoxy-4-hydroxyphenyl) butan-2-one compound
B=acid compound A 10% (weight/volume) stock solution was prepared by mixing 1 g of compound in 9 ml of aqueous 1‰ agar solution. Successive dilutions were made with the 1‰ agar solution.

Tests of Compounds A and B Alone

50 µl of each of the daughter solutions obtained containing compound A or B are added to the microplate wells. 100 µl of Sabouraud liquid nutrient broth inoculated at double concentration with the *Aspergillus niger* strain and 50 µl of aqueous 1‰ agar solution are also added thereto.

Tests of Compounds A and B as a Mixture

50 µl of each of the daughter solutions obtained containing compound A and 50 µl of each of the daughter solutions obtained containing compound B are added to the microplate wells. 100 µl of Sabouraud liquid nutrient broth inoculated at double concentration with the strain *Aspergillus niger* are also added thereto.

Microbial Growth Control

A positive microbial growth control was also prepared. The positive microbial growth control corresponds to a mixture of 100 µl of aqueous 1‰ agar solution with 100 µl of Sabouraud liquid nutrient broth inoculated at double concentration with the strain *Aspergillus niger* in the absence of compounds A and B.

Absorbance Control for Compounds A and B Alone

An absorbance control was performed in parallel on compounds A and B alone. This control corresponds to 100 µl of double concentration sterile Sabouraud liquid nutrient broth+100 µl of double concentration compound A or B.

In the three cases (absorbance control, growth control and test), the final volume present in each of the microplate wells is 200 µl.

In the two cases (test and control), the inoculum represents the concentration of the *Aspergillus niger* strain present in the final volume of the wells (200 µl) and is between 2 and 6×10$^5$ cfu/ml of *Aspergillus niger*.

The minimum inhibitory concentration (MIC) of each compound A and B alone and in combination was determined in a known manner by means of optical density measurements at a wavelength of 620 nm.

The test as described above (tests, absorbance control and growth control) was performed again to test the combination A+B on the following strains *Enterococcus faecalis, Staphylococcus aureus, Pseudomonas aeruginosa, Candida albicans*, where appropriate.

The following results were obtained with the compound B1=trisodium salt of ethylenediaminedisuccinic acid (as an aqueous solution at 30% by weight): sold under the name Natrlquest E30 by the company Innospec Active Chemicals.

*Staphylococcus aureus*

TABLES 1

| Concentrations tested (in active material weight %) | 0 A | 0.0625 A | 0.125 A | 0.25 A | 0.5 A | 1 A |
|---|---|---|---|---|---|---|
| 0 B1 | | 76 | 72 | 71 | 40 | −23 |
| 0.0375 B1 | 97 | 94 | 90 | 54 | 4 (FIC 0.56) | −13 |
| 0.075 B1 | 80 | 80 | 67 | 50 | 1 (FIC 0.63) | −13 |

TABLES 1-continued

| Concentrations tested (in active material weight %) | 0 A | 0.0625 A | 0.125 A | 0.25 A | 0.5 A | 1 A |
|---|---|---|---|---|---|---|
| 0.15 B1 | 66 | 70 | 78 | 57 | 2 (FIC 0.75) | −1 |
| 0.3 B1 | 37 | 53 | 60 | 62 | 1 (FIC 1) | −2 |
| 0.6 B1 | 1 | 1 | 1 | 1 | 0 | 2 |

TABLES 2

| % MIC of A alone | % MIC of B1 alone | MIC of each compound as a mixture | | FIC Index | Ratio A/B1 |
|---|---|---|---|---|---|
| | | A % | B1% | | |
| 1 | 0.6 | 0.5 | 0.3 | 1 | 1.66 |

The results obtained show synergistic inhibitory activity for the mixtures:
i) 0.5% of A and 0.3% of B1, i.e. A/B1 ratio=1.66
ii) 0.5% of A and 0.15% of B1, i.e. A/B1 ratio=3.33
iii) 0.5% of A and 0.075% of B1, i.e. A/B1 ratio=6.66
iv) 0.5% of A and 0.0375% of B1, i.e. A/B1 ratio=13.33

Example 2: Determination of the Synergistic Antimicrobial Activity as MIC on *Candida albicans*

The demonstration of a synergistic antimicrobial activity effect with a mixture of 4-(3-ethoxy-4-hydroxyphenyl)butan-2-one (referred to as substance A) and the sodium salt of 3-hydroxy-2-pentylcyclopentaneacetic acid (referred to as substance B2) (as a solution at 34% by weight in a 45/21 w/w water/dipropylene glycol mixture; sold under the name Mexoryl SBO by the company Chimex) was performed according to the conditions described in Example 1.

The following results were obtained:
*Candida albicans*

TABLES 3

| Concentrations tested (in active material weight %) | 0 A | 0.0625 A | 0.125 A | 0.25 A | 0.5 A |
|---|---|---|---|---|---|
| 0 B2 | | 76 | 64 | 36 | 5 |
| 0.34 B2 | 43 | 34 | 23 (FIC 0.75) | 9 (FIC 1) | 1 |
| 0.68 B2 | 6 | 3 | 1 | 1 | 0 |

TABLES 4

| % MIC of A alone | % MIC of B2 alone | MIC of each compound as a mixture | | FIC Index | Ratio A/B2 |
|---|---|---|---|---|---|
| | | A % | B2% | | |
| 0.5 | 0.68 | 0.25 | 0.34 | 1 | 0.73 |

The results obtained show synergistic inhibitory activity for the mixtures:
i) 0.25% of A and 0.34% of B2, i.e. A/B2 ratio=0.73
ii) 0.125% of A and 0.34% of B2, i.e. A/B2 ratio=0.37

Example 3

The demonstration of a synergistic antimicrobial activity effect with a mixture of 4-(3-ethoxy-4-hydroxyphenyl)butan-2-one (referred to as substance A) and of silver citrate hydrate (referred to as substance B3) (reference 361259-10G from Sigma-Aldrich) was performed according to the conditions described in Example 1.

*Aspergillus niger*

TABLES 5

| Concentrations tested (in weight %) | 0 A | 0.025 A | 0.05 A | 0.1 A |
|---|---|---|---|---|
| 0 B3 | | 44 | 32 | 13 |
| 0.025 B3 | 47 | 28 | 20 (FIC 0.75) | 9 |
| 0.05 B3 | 40 | 20 (FIC 0.75) | 20 (FIC 1) | 7 |
| 0.1 B3 | 9 | 4 | 6 | 2 |

TABLES 6

| % MIC of A alone | % MIC of B3 alone | MIC of each compound as a mixture | | FIC Index | Ratio A/B3 |
|---|---|---|---|---|---|
| | | A % | B3% | | |
| 0.1 | 0.1 | 0.05 | 0.05 | 1 | 1 |

The results obtained show synergistic inhibitory activity for the mixtures:
i) 0.05% of A and 0.05% of B3, i.e. A/B3 ratio=1
ii) 0.025% of A and 0.05% of B3, i.e. A/B3 ratio=0.5
iii) 0.05% of A and 0.025% of B3, i.e. A/B3 ratio=2

Example 4

The demonstration of a synergistic antimicrobial activity effect with a mixture of 4-(3-ethoxy-4-hydroxyphenyl)butan-2-one (referred to as substance A) and of sodium hydroxymethylglycinate (in water at 50% by weight) (referred to as substance B4) was performed according to the conditions described in Example 1.

*Enterococcus faecalis*

TABLES 6

| Concentrations tested (in active material weight %) | 0 A | 0.0625 A | 0.125 A | 0.25 A | 0.5 A |
|---|---|---|---|---|---|
| 0 B4 | | 31 | 36 | 39 | −9 |
| 0.005 B4 | 32 | 18 (FIC 0.63) | 19 (FIC 0.75) | 13 (FIC 1) | 5 |
| 0.01 B4 | 11 | 6 | 7 | 3 | 2 |

TABLES 7

| % MIC of A alone | % MIC of B4 alone | MIC of each compound as a mixture | | FIC Index | Ratio A/B4 |
|---|---|---|---|---|---|
| | | A % | B4% | | |
| 0.5 | 0.1 | 0.25 | 0.005 | 1 | 50 |

The results obtained show synergistic inhibitory activity for the mixtures:
i) 0.25% of A and 0.005% of B3, i.e. A/B4 ratio=50
ii) 0.125% of A and 0.005% of B3, i.e. A/B4 ratio=25
iii) 0.0625% of A and 0.005% of B3, i.e. A/B4 ratio=12.5

The invention claimed is:
1. A synergistic antimicrobial mixture comprising:
4-(3-ethoxy-4-hydroxyphenyl) butan-2-one and salts thereof with an organic or inorganic acid or base, and solvates thereof; and
at least one acid compound chosen from:
i) ethylenediaminedisuccinic acid and salts thereof;
ii) jasmonate compounds (I) and salts thereof;

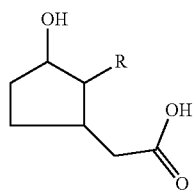

(I)

in which formula (I) R denotes a saturated or unsaturated linear hydrocarbon-based radical containing from 2 to 7 carbon atoms;
iii) glycinate compounds of formula (II) and the salts thereof:

$$R_1R_2NCH_2COO^-X^+$$ (II)

$R_1$ and $R_2$ denoting a hydrogen atom or a hydroxy ($C_1$-$C_4$) alkyl group;
$X^+$ denoting a cationic counterion;
or at least one silver-based compound chosen from:
i) silver I and II oxides;
ii) silver particles;
iii) Ag I or Ag II salts chosen from the following formulae:
a) AgHal with Hal representing a halogen atom;
b) AgHal$_2$, with Hal being identical or different; and
c) $Ag_xR^3_z$ and also solvates thereof, with
$R_3$, which may be identical or different, representing a group chosen from:
sulfate;
nitrate;
hydroxy;
($C_1$-$C_6$) alkylcarboxylate in which the ($C_1$-$C_6$) alkyl group is linear or branched and is optionally substituted with one or more hydroxyl, carboxyl or carboxylate groups;
an aryl group substituted with at least one carboxylate group and optionally substituted with one or more hydroxyl groups; and
x and z are integers such that 1≤z≤6, 1≤x≤4;
wherein the 4-(3-ethoxy-4-hydroxyphenyl) butan-2-one and salts thereof with an organic or inorganic acid or base, and solvates thereof and the at least one acid compound or at least one silver-based compound are in synergistically effective amounts such that the mixture results in synergistic antimicrobial activity due to the 4-(3-ethoxy-4-hydroxyphenyl) butan-2-one and salts thereof with an organic or inorganic acid or base, and solvates thereof and the at least one acid compound or at least one silver-based compound; and
wherein
when the mixture comprises ethylenediaminedisuccinic acid or salts thereof, the 4-(3-ethoxy-4-hydroxyphenyl) butan-2-one and ethylenediaminedisuccinic acid or salts thereof are present in said mixture in a weight ratio such that the 4-(3-ethoxy-4-hydroxyphenyl) butan-2-one/ethylenediaminedisuccinic acid or salts thereof weight ratio ranges from 1.5 to 15;
when the mixture comprises the jasmonate compounds (I), the 4-(3-ethoxy-4-hydroxyphenyl) butan-2-one and the jasmonate compounds (I) are present in said mixture in a content such that the weight ratio ranges from 0.3 to 1.20;
when the mixture comprises the glycinate compounds of formula (II, the 4-(3-ethoxy-4-hydroxyphenyl) butan-2-one and the glycinate compounds of formula (II) and the salts thereof are present in said mixture in a content such that the 4-(3-ethoxy-4-hydroxyphenyl) butan-2-one/glycinate compounds of formula (II) or salts thereof weight ratio ranges from 10 to 80; and
when the mixture comprises a silver-based compound; the 4-(3-ethoxy-4-hydroxyphenyl) butan-2-one and the silver-based compounds are present in said mixture in a content such that the 4-(3-ethoxy-4-hydroxyphenyl) butan-2-one/silver-based compound weight ratio ranges from 0.4 to 4.

2. The mixture as claimed in claim 1, wherein the salts are chosen from the salts of alkali metals or alkaline-earth metals, aluminum or zinc, or ammonium salts of ($C_1$-$C_4$) alkanolamine.

3. The mixture as claimed in claim 1, wherein the 4-(3-ethoxy-4-hydroxyphenyl) butan-2-one and ethylenediaminedisuccinic acid or salts thereof are present in said mixture in a weight ratio such that the 4-(3-ethoxy-4-hydroxyphenyl) butan-2-one/ethylenediaminedisuccinic acid or salts thereof weight ratio ranges from 2.5 to 15 and which exhibits synergism against Gram-positive bacterium.

4. The mixture as claimed in claim 1, wherein the compound of formula (I) is chosen from 3-hydroxy-2-[2-pentenyl]cyclopentaneacetic acid or 3-hydroxy-2-pentylcyclopentaneacetic acid and/or salts thereof.

5. The mixture as claimed in claim 1, wherein the 4-(3-ethoxy-4-hydroxyphenyl) butan-2-one and the jasmonate compounds (I) are present in said mixture in a content such that the weight ratio ranges from 0.45 to 1.20 and which exhibits synergism against yeast.

6. The mixture as claimed in claim 1, wherein the glycinate compound (II) and the salts thereof are chosen from hydroxymethylglycinate salts.

7. The mixture as claimed in claim 1, wherein—the 4-(3-ethoxy-4-hydroxyphenyl) butan-2-one and the glycinate compounds of formula (II) and the salts thereof are present in said mixture in a content such that the 4-(3-ethoxy-4-hydroxyphenyl) butan-2-one/glycinate compounds of formula (II) or salts thereof weight ratio ranges from 20 to 60 and which exhibits synergism against Gram-positive bacterium.

8. The mixture as claimed in claim 1, wherein the silver-based (Ag) compounds are chosen from silver ($C_1$-$C_6$) alkylcarboxylates.

9. The mixture as claimed in claim 1, wherein 4-(3-ethoxy-4-hydroxyphenyl) butan-2-one and the silver-based compounds are present in said mixture in a content such that the 4-(3-ethoxy-4-hydroxyphenyl) butan-2-one/silver-based compound weight ratio ranges from 0.4 to 3.6 and which exhibits synergism against mold.

10. A composition comprising, in a physiologically acceptable medium, an antimicrobial mixture as claimed in claim 1.

11. The composition as claimed in claim 10, which comprises at least one additional ingredient chosen from water, oils, polyols containing from 2 to 10 carbon atoms, gelling agents, surfactants, film-forming polymers, dyestuffs, fragrances, fillers, UV-screening agents, plant extracts, cosmetic and dermatological active agents, and salts.

12. The composition as claimed in claim 10, wherein the 4-(3-ethoxy-4-hydroxyphenyl) butan-2-one is present in a content ranging from 0.01% to 5% by weight relative to the total weight of the composition.

13. A nontherapeutic cosmetic treatment process for caring for and/or making up and/or cleansing keratin materials, comprising the application to said keratin materials of a composition as claimed in claim 10.

14. A process for conserving a composition, comprising a physiologically acceptable medium, which comprises incorporating into said composition an antimicrobial mixture as claimed in claim 1.

15. A process for preserving a cosmetic or pharmaceutical composition which comprises incorporating into said composition an antimicrobial mixture as defined in claim 1.

16. A nutritional composition comprising an antimicrobial mixture as claimed in claim 10.

17. A process for preserving a nutritional composition, which comprises incorporating into said composition an antimicrobial mixture as claimed in claim 1.

18. A process for treating water which comprises incorporating the antimicrobial mixture as claimed in claim 1 into water is chosen from domestic or industrial waters, waters from aquatic media, swimming pool/spa waters, and waters from air-conditioning systems.

19. A continuous or discontinuous water treatment process comprising at least one step of placing a water sample to be treated or a water stream to be treated, said water being chosen from domestic or industrial waters, waters from aquatic media, swimming pool/spa waters, and waters from air-conditioning systems, in contact with the antimicrobial mixture as claimed in claim 1.

20. The mixture as claimed in claim 2, wherein the salts are chosen from the salts of alkaline-earth metals.

* * * * *